United States Patent
Bonn et al.

(10) Patent No.: US 12,298,234 B2
(45) Date of Patent: May 13, 2025

(54) METHOD OF CREATING A LOCAL OSCILLATOR LIGHT BEAM AND LOCAL OSCILLATOR SOURCE APPARATUS FOR PHASE-RESOLVED SPECTROSCOPY

(71) Applicant: Max-Planck-Gesellschaft zur Foerderung der Wissenschaften e. V., Munich (DE)

(72) Inventors: Mischa Bonn, Frankfurt (DE); Maksim Grechko, Mainz (DE); Max Lukas, Nieder-Olm (DE); Laura Vietze, Darmstadt (DE)

(73) Assignee: Max-Planck-Gesellschaft zur Foerderung der Wissenschaften e. V., Munich (DE)

( * ) Notice: Subject to any disclaimer, the term of this patent is extended or adjusted under 35 U.S.C. 154(b) by 163 days.

(21) Appl. No.: 18/275,103

(22) PCT Filed: Feb. 18, 2022

(86) PCT No.: PCT/EP2022/054116
§ 371 (c)(1),
(2) Date: Jul. 31, 2023

(87) PCT Pub. No.: WO2022/175471
PCT Pub. Date: Aug. 25, 2022

(65) Prior Publication Data
US 2024/0118192 A1    Apr. 11, 2024

(30) Foreign Application Priority Data
Feb. 19, 2021 (EP) .................................. 21158114

(51) Int. Cl.
*G01N 21/31* (2006.01)
*G01J 3/453* (2006.01)

(52) U.S. Cl.
CPC ...... *G01N 21/31* (2013.01); *G01J 2003/4534* (2013.01)

(58) Field of Classification Search
CPC ....... G01N 21/31; G01N 21/39; G01J 3/4338; G01J 3/10; G01J 2003/4534
See application file for complete search history.

(56) References Cited

U.S. PATENT DOCUMENTS 7,372,577 B1  5/2008 Sullivan et al.
10,605,727 B2  3/2020 Lukens et al.
(Continued)

FOREIGN PATENT DOCUMENTS

EP        0030891 B1    1/1984
WO   WO-2018084552 A1 *  5/2018  ............... G01J 9/02

OTHER PUBLICATIONS

Garling et al. (2019). A general approach to combine the advantages of collinear and noncollinear spectrometer designs in phase-resolved second order nonlinear spectroscopy. The Journal of Physical Chemistry, 123, 11022-11030 (Year: 2019).*

(Continued)

*Primary Examiner* — Tarifur R Chowdhury
*Assistant Examiner* — Carlos Perez-Guzman
(74) *Attorney, Agent, or Firm* — Caesar Rivise, PC (57) ABSTRACT

A method of creating a local oscillator light beam LO for a phase-resolved spectroscopy measurement comprises the steps of providing a first measuring light beam (1) and a second measuring light beam (2) being aligned to each other, creating the local oscillator light beam LO by an optical non-linear interaction of a first portion (1A) of the first measuring light beam (1) and a first portion (2A) of the second measuring light beam (2) in an optical nonlinear medium (20), and superimposing the local oscillator light beam LO, a second portion (1B) of the first measuring light (Continued)

beam (1) and a second portion (2B) of the second measuring light beam (2) with a predetermined mutual phase relationship, for providing a sample light beam (3) for the phase-resolved spectroscopy measurement. The local oscillator light beam LO and the second portions (1B, 2B) of the first and second measuring light beams (1, 2) are superimposed with a displaced Sagnac interferometer (10).

18 Claims, 2 Drawing Sheets

(56) References Cited

U.S. PATENT DOCUMENTS

2017/0315054 A1* 11/2017 Lukens .............. G01B 9/02003
2018/0120086 A1* 5/2018 Lenzner ............. G01N 33/0004

OTHER PUBLICATIONS

Beyersdorf et al. (1999). Polarization sagnac interferometer with a common-path local oscillator for heterodyne detection. J. Opt. Soc. Am. B, 16(9), 1354-1358.

Courtney et al. (2014). Enhanced interferometric detection in two-dimensional spectroscopy with a sagnac interferometer. Optics Letters, 39(3), 513-516.

Garling et al. (2019). A general approach to combine the advantages of collinear and noncollinear spectrometer designs in phase-resolved second order nonlinear spectroscopy. The Journal of Physical Chemistry, 123, 11022-11030.

Nihonyanagi et al. (2009). Direct evidence for orientational flip-flop of water molecules at charged interfaces: A heterodyne-detected vibrational sum frequency generation study. The Journal of Chemical Physics, 130, 204704.

Sahoo et al. (2020). Quantum state interferography. Light and Matter Physics, Raman Research Institute, Bengalura 560080, India, Quantum Information and Computation Group, Harish-Chandra Research Institute, HBNI, Allahabad 211019, India.

Thaemer et al. (2018). Detecting weak signals from interfaces by high accuracy phase-resolved SFG spectroscopy. Phys. Chem. Chem. Phys., 20, 25875-25882.

Thaemer et al. Detecting Weak Signals from Interfaces by High Accuracy Phase-Resolved SFG Spectroscopy. arXiv:1808.04255v1 [physics.optics] Aug. 13, 2018.

Xu et al. (2015). Stabilized phase detection of heterodyne sum frequency generation for interfacial studies. Optics Letters, 40(19), 4472-4475.

Yamaguchi et al. (2008). Heterodyne-detected electronic sum frequency generation: "Up" versus "down" alignment of interfacial molecules. The Journal of Chemical Physics, 129, 101102.

International Search Report for PCT/EP2022/054116 dated Apr. 25, 2022.

* cited by examiner

METHOD OF CREATING A LOCAL OSCILLATOR LIGHT BEAM AND LOCAL OSCILLATOR SOURCE APPARATUS FOR PHASE-RESOLVED SPECTROSCOPY

CROSS-REFERENCE TO RELATED APPLICATIONS

This application is a U.S. National Phase Application of PCT/EP2022/054116, filed Feb. 18, 2022, which claims priority to EP 21158114.5, filed Feb. 19, 2021, the contents of which applications are incorporated herein by reference in their entireties for all purposes.

FIELD OF THE INVENTION

The invention relates to a method of creating a local oscillator light beam for a phase-resolved spectroscopy measurement and to a local oscillator source apparatus. Furthermore, the invention relates to a phase-resolved spectroscopy measuring method and to a phase-resolved spectroscopy measurement apparatus, employing the local oscillator source apparatus. Applications of the invention are available e. g. in the fields of phase-resolved optical measurements, in particular phase-resolved spectroscopy.

PRIOR ART

In the present specification, reference is made to the following prior art illustrating the technical background of the invention:
[1] S. Yamaguchi et al. in "J. Chem. Phys." 2008, 129 (10);
[2] S. Nihonyanagi et al. in "J. Chem. Phys." 2009, 130 (20);
[3] B. Xu et al. in "Opt. Lett." 2015, 40 (19), 4472;
[4] T. Garling et al. in "J. Phys. Chem. A" 2019, 123 (51), 11022-11030;
[5] M. Thämer et al. in "Phys. Chem. Chem. Phys." 2018, 20 (40), 25875-25882;
[6] P. T. Beyersdorf et al. in "J. Opt. Soc. Am. B/Vol. 16, No. 9/September 1999;
[7] U.S. Pat. No. 7,372,577 B1;
[8] U.S. Pat. No. 10,605,727 B2; and
[9] EP 0 030 891 B1.

It is generally known that phase-resolved spectroscopy, including e. g. phase resolved sum-frequency generation (SFG) spectroscopy, time-resolved sum frequency generation (TR-SFG) spectroscopy or two-dimensional Terahertz-InfraRed-Visible (2D TIRV) spectroscopy, is employed in experimental investigations of molecules, e. g. molecular dynamics.

Phase-resolved spectroscopy requires a so-called local oscillator (LO). The LO is at least one light pulse that interferes with a signal light pulse (sample response) created by a sample in response to an irradiation with at least two excitation beams. In contrast to intensity based spectroscopy, the LO enables measuring the electric field of the signal light pulse. To this end, the LO is required to provide a precise and reproducible time scale, and it needs to be delayed in time relative to the signal pulse in controlled manner by few to several picoseconds (or even more, depending on the required spectral resolution).

The LO is generated from two excitation beams in a non-linear optical medium. Currently, the most abundant implementation of SFG spectroscopy is using non-collinear beams, wherein the LO travels separately from the excitation beams. In this configuration, the LO is delayed in time by passing it through a dispersive medium with refractive index larger then refractive index of air, e. g. a delay plate ([1], [2]).

In SFG spectroscopy with non-collinear beams, the LO and the excitation beams have different angles of incidence relative to a normal axis of the sample. As a main limitation, the phase of the signal light pulse is highly sensitive to the sample position along the normal axis. Depending on the angle between the excitation beams and their angles of incidence, this position needs to be maintained with accuracy up to 100 nm over a course of measurements, which is technologically challenging.

In contrast, in SFG spectroscopy using collinear beams, the phase of the signal does not depend on position of the sample. This fact, as well as relative simplicity of alignment of an experimental setup makes collinear SFG spectroscopy attractive. However, generating few to several picosecond time delay between the LO and signal light is challenging in collinear geometry, because all beams (excitation beams and LO) travel the same optical pathway. There are two approaches to produce the time delay of collinear beams that have been implemented so far.

The first approach utilizes dispersion of an optical material to generate a time delay between the excitation pulses and the LO ([3]). This approach is hindered by availability of optical materials with suitable dispersion at wavelengths of the excitation beams and LO. The second approach is based on utilization of a Michelson-type interferometer ([4], [5]). This approach requires active phase stabilization, because Michelson-type interferometers have insufficient phase stability (phase-resolved measurements require about 1 fs stability of the time delay between the signal light and LO). Active phase stabilization significantly complicates experimental setup.

Employing a polarization Sagnac interferometer with a common-path local oscillator for heterodyne detection is described in [6]. The polarization Sagnac interferometer is used in a symmetric fashion with detection on a dark fringe of interference to avoid detector saturation when high-powered illumination is used. By modulating a carrier field that is reflected from the interferometer, LO is generated for the heterodyne detection of the signal light. This experimental set-up may have disadvantages in terms of high sensitivity to optical element misalignments and imperfect polarization, that may reduce the shot-noise-limited sensitivity of the interferometer.

Further applications of Sagnac interferometers are known for detecting a change in position of an object [7], applying a phase shift to a light beam [8] and measuring a phase difference of electromagnetic waves [9].

OBJECTIVE OF THE INVENTION

The objective of the invention is to provide an improved method and apparatus for creating a local oscillator light beam and/or an improved phase-resolved spectroscopy measurement technique, being capable of avoiding limitations of conventional techniques. In particular, the objective of the invention is to create excitation and LO beams with collinear geometry, while being capable of avoiding limitations resulting from the use of certain dispersive material for generating the time delay between the excitation pulses and the LO and avoiding a complex active interferometer phase stabilization as needed in conventional techniques.

BRIEF SUMMARY OF THE INVENTION

These objectives are correspondingly solved by a method of creating a local oscillator light beam for a phase-resolved spectroscopy measurement, a phase-resolved spectroscopy measuring method, a local oscillator source apparatus, and a phase-resolved spectroscopy measurement apparatus of the invention.

According to a first general aspect of the invention, the above objective is solved by a method of creating a local oscillator light beam for a phase-resolved spectroscopy measurement, comprising the steps of providing a first measuring light beam and a second measuring light beam being aligned to each other, creating the local oscillator light beam by an optical non-linear interaction of a first portion of the first measuring light beam and a first portion of the second measuring light beam in an optical nonlinear medium, and superimposing the local oscillator light beam, a second portion of the first measuring light beam and a second portion of the second measuring light beam with a predetermined mutual phase relationship (in particular mutual time delay), for providing a sample light beam for the phase-resolved spectroscopy measurement. According to the invention, the local oscillator light beam is created and the local oscillator light beam and the second portions of the first and second measuring light beams are superimposed with a displaced Sagnac interferometer, wherein the displaced Sagnac interferometer has a first interferometer ring beam path guiding the first portions of the first and second measuring light beams to the optical nonlinear medium and further guiding the local oscillator light beam created in the optical nonlinear medium, and the displaced Sagnac interferometer has a second interferometer ring beam path having a displacement relative to the first interferometer ring beam path and guiding the second portions of the first and second measuring light beams.

According to a second general aspect of the invention, the above objective is solved by a phase-resolved spectroscopy measuring method, including the steps of providing the local oscillator light beam and the sample light beam with the method of the first general aspect of the invention or an embodiment thereof, irradiating a sample under investigation with the sample light beam, and phase-sensitive detection of a sample response beam. Preferably, the phase-sensitive detection of the sample response beam comprises one of sum frequency generation (SFG) spectroscopy and two-dimensional Terahertz-InfraRed-Visible (2D TIRV) spectroscopy.

According to a third general aspect of the invention, the above objective is solved by a local oscillator source apparatus, being configured for creating a local oscillator light beam for a phase-resolved spectroscopy measurement, comprising an input device being arranged for aligning a first measuring light beam and a second measuring light beam, an optical nonlinear medium being arranged for creating the local oscillator light beam by an optical non-linear interaction of a first portion of the first measuring light beam and a first portion of the second measuring light beam, and a combining device being arranged for superimposing the local oscillator light beam, a second portion of the first measuring light beam and a second portion of the second measuring light beam with a predetermined mutual phase relationship, for providing a sample light beam for the phase-resolved spectroscopy measurement. According to the invention, the combining device comprises a displaced Sagnac interferometer being arranged for creating the local oscillator light beam and for superimposing the local oscillator light beam and the second portions of the first and second measuring light beams, wherein the displaced Sagnac interferometer has a first interferometer ring beam path being arranged for guiding the first portions of the first and second measuring light beams to the optical nonlinear medium and for further guiding the local oscillator light beam created in the optical nonlinear medium, and the displaced Sagnac interferometer has a second interferometer ring beam path having a displacement relative to the first interferometer ring beam path and being arranged for guiding the second portions of the first and second measuring light beams. Preferably, the inventive local oscillator source apparatus or an embodiment thereof is configured for executing the method of the first general aspect of the invention or an embodiment thereof and/or for executing the phase-resolved spectroscopy measuring method of the second general aspect of the invention or an embodiment thereof. Advantageously, the local oscillator source apparatus provides an optical module which can be combined with multiple different types of light source devices and detection setups as required for a particular application of the invention. The local oscillator source apparatus can be used like a plug-in module allowing a combination with the light source device and the detection setup.

The first measuring light beam and the second measuring light beam are created by a light source device. The input device and the optical nonlinear medium can be configured for an adaptation to the given light source device used for creating the light beams. In particular, the optical properties of the input device and the optical nonlinear medium can be configured in dependency on the characteristics of a given light source device (in particular wavelength, polarization, intensity, pulse duration, repetition frequency, beam shape) for aligning the first and second measuring light beams and for creating the local oscillator light beam.

According to a fourth general aspect of the invention, the above objective is solved by a phase-resolved spectroscopy measurement apparatus, including a light source device being arranged for creating a first measuring light beam and a second measuring light beam, the local oscillator source apparatus according to the third general aspect of the invention or an embodiment thereof, being arranged for providing the sample light beam, and a sample holder device being arranged for holding a sample under investigation, so that the sample can be irradiated with the sample light beam, and a phase-sensitive detection setup, being arranged for detecting a sample response beam. Preferably, the inventive phase-resolved spectroscopy measurement apparatus or an embodiment thereof is configured for executing the phase-resolved spectroscopy measuring method of the second general aspect of the invention or an embodiment thereof. With preferred examples, the phase-sensitive detection setup comprises one of a sum frequency generation (SFG) spectroscopy setup and a two-dimensional Terahertz-InfraRed-Visible (2D TIRV) spectroscopy setup.

The term "Sagnac interferometer" (also known as ring interferometer or common path interferometer) refers to an arrangement of multiple, preferably four, reflecting elements, preferably with plane reflective surfaces, spanning two interferometer ring beam paths. With a conventional Sagnac interferometer, a beam of light is split by a first semi-reflective element into two partial beams that are made to follow the same path but in opposite directions, i. e. both interferometer ring beam paths are identical. The displaced Sagnac interferometer used with the invention is configured by setting the reflecting elements such that the two interferometer ring beam paths are displaced relative to each other. Both of the first and second interferometer ring beam paths extend from the beam splitter element via the reflecting elements, in parallel. The light beams travel on the beam paths in parallel, but with opposite directions, following the interferometer ring configuration, from the first reflecting element back to the first reflecting element, where they are superimposed. The displacement of the interferometer ring beam paths is obtained by shifting at least one of the reflecting elements along a normal of a reflective surface thereof.

The first and second measuring light beams (or: first and second excitation light beams) preferably comprise pulsed laser light, i. e. sequences of laser pulses. The first and second measuring light beams may have the same or different center wavelengths (or respective optical frequencies) and/or the same or different pulse durations of the laser pulses. Pulse durations are selected in a range from 50 fs to 5 ps.

Before entering the displaced Sagnac interferometer, the first and second measuring light beams are aligned to each other, i. e. they travel along a common input light path so that the electric fields of the measuring light pulses are superimposed in time and space.

With the first reflecting element (also indicated as beam splitter element), each of the first and second measuring light beams is split into two portions, called first and second portions of the first and second measuring light beams, resp. Preferably, the first and second portions of the first and second measuring light beams have different amplitudes, wherein the portion used for creating the local oscillator light beam (indicated as the first portion) has a smaller amplitude than the portion used for exciting the sample (indicated as the second portion). Particularly preferred, the amplitudes of the first and second portions have a ratio of less than 0.1.

The displaced Sagnac interferometer includes the optical nonlinear medium, like e. g. a nonlinear crystal or alternatively a fluid or even a vapour or gas, like air polarized in an electric field between electrodes, wherein the optical non-linear medium is arranged for creating the local oscillator light beam. In the optical non-linear medium, the first portion of the first measuring light beam and the first portion of the second measuring light beam are superimposed in time and space such that the local oscillator light beam is created by an optical non-linear interaction, e. g. by sum frequency generation obtained from the optical frequencies of the first and second measuring light beams. The local oscillator light beam comprises pulsed laser light, i. e. a sequence of local oscillator laser pulses having a center wavelength (or corresponding optical frequencies) determined by the optical non-linear interaction. The pulses of the local oscillator occur at a fixed time and with a fixed phase relative to the measuring light pulses, so that the local oscillator also can be indicated as temporal reference pulse(s).

The optical nonlinear medium is arranged in the first interferometer ring beam path guiding the first portions of the first and second measuring light beams, but not in the second interferometer ring beam path. The second portions of the first and second measuring light beams do not pass the optical nonlinear medium. By positioning the optical non-linear medium exclusively in the first interferometer ring beam path, the local oscillator light beam is created in the first interferometer ring beam path only.

The first and second interferometer ring beam paths are superimposed at the beam splitter element of the displaced Sagnac interferometer at both ends thereof, i. e. the local oscillator light beam running along the first interferometer ring beam path is superimposed at the beam splitter element with the second portions of the first and second measuring light beams. The local oscillator light beam and the second portions of the first and second measuring light beams are coupled out of the displaced Sagnac interferometer in an aligned manner. Thus, the first reflecting element or beam splitter element is simultaneously provided as a beam combiner element creating the collinear provision of the local oscillator light beam with the measuring light beams.

Advantageously, the inventive technique is based on the displaced Sagnac interferometer, which provides the collinear geometry of measuring light beams and LO and has significantly higher phase stability as compared to Michelson-type interferometers. Furthermore, because the inventive technique does not necessarily employ dispersion for setting a time delay of LO and measuring light beams, it is not limited by availability of one certain dispersive material and can be used in a broad wavelength range from mid-infrared via visible to ultraviolet light.

A further advantage of the invention results from the broad range of applications. There is a number of phase-resolved spectroscopy techniques that employ heterodyne detection (like phase-resolved sum-frequency generation spectroscopy, two-dimensional phase-resolved sum-frequency generation spectroscopy, two-dimensional terahertz-infrared visible spectroscopy etc.). Heterodyne detection requires the generation of the optical local oscillator. Phase stability of the local oscillator relative to optical measuring signal (sample response light) influences signal acquisition time and data quality. The phase between local oscillator and signal mainly can be affected by a fluctuating time delay of one of these fields relative to another. Typical stability of this time delay needed for phase-resolved spectroscopy is on about 1 fs time scale. This stability usually requires sophisticated active phase stabilizing solutions in prior art. On the contrary, the invention provides a passive highly phase-stable optical instrument to generate the local oscillator. In other words, phase stability is inherently obtained by creating the local oscillator light beam in the displaced Sagnac interferometer and superimposing it with the measuring light beams, preferably without a phase stabilization control acting on one of the optical components creating the local oscillator light beam and/or relaying the measuring light beams.

According to the invention, the displaced Sagnac interferometer has in succession the first reflecting element, comprising a transparent plate and being arranged as the beam splitter element for coupling light into and out of the displaced Sagnac interferometer, a second reflecting element, a third reflecting element and a fourth reflecting element, wherein the first portions of the first and second measuring light beams are directed from the first reflecting element along the first interferometer ring beam path to the optical nonlinear medium and the local oscillator light beam created in the optical nonlinear medium is directed further along the first interferometer ring beam path to the first reflecting element, the second portions of the first and second measuring light beams are directed from the first reflecting element along the second interferometer ring beam path back to the first reflecting element, and at the first reflecting element, the local oscillator light beam and the second portions of the first and second measuring light beams are combined and coupled out of the displaced Sagnac interferometer as the sample light beam. Preferably, the displaced Sagnac interferometer has no more than the four reflecting elements for spanning the interferometer ring beam paths. Advantageously, with the provision of the four reflecting elements, adjustment of the displaced Sagnac interferometer is facilitated. The second to fourth reflecting elements preferably comprise mirrors, e. g. mirrors with a metallic surface. Alternatively, the displaced Sagnac interferometer may have more than four reflecting elements for spanning the interferometer ring beam paths, e. g. if advantages for the beam path geometry in a particular application of the invention are obtained.

According to a preferred embodiment of the invention, a focusing element, the optical nonlinear medium and a collimating element are arranged in the first interferometer ring beam path, particularly preferred between the second reflecting element and the third reflecting element, and the first portions of the first and second measuring light beams are focused with the focusing element into the optical nonlinear medium and the local oscillator light beam is re-collimated with the collimating element. The focusing element comprises e. g. at least one lens being preferably arranged exclusively in the first interferometer ring beam path with a focus of both of the first and second measuring light beams within the optical nonlinear medium. The collimating element comprises at least one lens, again being preferably arranged exclusively in the first interferometer ring beam path downstream of the optical nonlinear medium with a focus of both of the first and second measuring light beams within the optical nonlinear medium. Preferably, overlapping foci are created. With the provision of the focusing element, the efficiency of the creation of the local oscillator light beam is improved in an advantageous manner. Furthermore, the collimating element improves the superposition of the local oscillator light beam with the second portions of the first and second measuring light beams.

It is noted that the provision of the focusing and/or collimating elements is not strictly necessary for implementing the invention. According to an alternative embodiment, in particular if the intensities of the measuring light beam portions directed to the optical nonlinear medium are sufficient for creating the local oscillator light beam, the focusing and/or collimating elements can be omitted. With this variant of the invention, the displaced Sagnac interferometer can be configured without a focusing and/or collimating element.

According to a further advantageous embodiment of the invention, the method of creating the local oscillator light beam includes a step of adjusting the displacement of the second interferometer ring beam path relative to the first interferometer ring beam path by shifting one of the second, third and fourth reflecting elements, i. e. a variable displacement may be settable with an adjustment device. In terms of the local oscillator source apparatus one of the second, third and fourth reflecting elements preferably is shiftable, e. g. with a precision motor drive or a piezoelectric actuator or by manual operation, for adjusting the displacement of the second interferometer ring beam path relative to the first interferometer ring beam path.

The adjustable configuration of the displaced Sagnac interferometer is not strictly required for implementing the invention. Depending on the conditions of a particular application of the invention, the displacement of the second interferometer ring beam path relative to the first interferometer ring beam may be fixed. With this embodiment, advantages for a compact setup of the displaced Sagnac interferometer can be obtained.

According to another advantageous embodiment of the invention, setting the mutual phase relationship of the local oscillator light beam and the second portions of the first and second measuring light beams can be provided by guiding at least one of the local oscillator light beam and the second portions of the first and second measuring light beams through at least one dispersive element arranged in at least one of the first and second interferometer ring beam paths. Thus, according to a preferred variant of the local oscillator source apparatus, at least one dispersive element is arranged in at least one of the first and second interferometer ring beam paths for setting the mutual phase relationship of the local oscillator light beam and the second portions of the first and second measuring light beams. Advantageously, the at least one dispersive element allows targeted setting the phase relationship, in particular by selecting the material and/or thickness of the at least one dispersive element.

The at least one dispersive element is a transmissive medium, preferably a solid medium, having a predetermined dispersion being larger than the refractive index of air and introducing a time delay into the respective beam path. According to a first variant, the at least one dispersive element, preferably one single dispersive element, is arranged exclusively in one of the interferometer ring beam paths. According to further variants, at least one dispersive element, preferably one single dispersive element, is arranged in each of the interferometer ring beam paths. Advantageously, the at least one dispersive element in each interferometer ring beam path can be specifically selected in dependency on the centre wavelengths of the local oscillator light beam or the measuring light beams and/or the time delay to be obtained. Thus, restrictions to a material, that is simultaneously matched to all light beams are avoided.

Alternatively, the displaced Sagnac interferometer can be configured without an additional dispersive element setting the time delay. As the presence of the optical nonlinear medium, the focusing lens and the collimating lens (which altogether constitute e. g. about 4 mm of material) makes the optical pathway in the first interferometer ring beam path longer than in the second interferometer ring beam path, even when there is no additional dispersive element. Accordingly, the time delay can be set with the optical nonlinear medium, the focusing lens and the collimating lens.

According to a particularly preferred embodiment, the transparent plate providing the first reflecting element of the displaced Sagnac interferometer has a wedge shape. The first reflecting element with the wedge shape is a plate with plate surfaces being inclined relative to each other by a wedge angle. Preferably, the wedge angle is below 50, particularly preferred below 20, e. g. 1°. With the wedge shape of the first reflecting element the following advantage is obtained. As outlined above, the first reflecting element is arranged as an incoupling beam splitter element and outcoupling beam combiner element, i. e. it is partially reflective and partially transmissive, so that both plate surfaces are partially reflective surfaces. With the wedge shape, double reflections travelling on the same beam path and corresponding double pulses are avoided.

According to another preferred embodiment of the invention, the method of creating the local oscillator light beam includes a step superimposing the first and second measuring light beams with a beam combiner device, and aligning the first and second measuring light beams into the displaced Sagnac interferometer though two irises arranged between the beam combiner device and the first reflecting element. The beam combiner device preferably comprises a cube arrangement of two prisms. Advantageously, the combination of the beam combiner device with the two irises allows an improvement of the spatial overlap of the first and second measuring light beams before incoupling into the displaced Sagnac interferometer.

Features disclosed in the context of the method of creating the local oscillator light beam and/or the phase-resolved spectroscopy measuring method and embodiments thereof also represent preferred features of the inventive local oscillator source apparatus and/or phase-resolved spectroscopy measurement apparatus and embodiments thereof. The aforementioned aspects and inventive and preferred features, in particular with regard to the configuration of the apparatuses as well as the dimensions and compositions of individual components being described in relation to the apparatuses, also apply for the methods. The preferred embodiments, variants and features of the invention described above are combinable with one another as desired.

BRIEF DESCRIPTION OF THE DRAWINGS

Further details and advantages of the invention are described in the following with reference to the attached drawings, which schematically show in.

PREFERRED EMBODIMENTS OF THE INVENTION

Features of preferred embodiments of the invention are described in the following with reference to the creation of the local oscillator light beam and the alignment with the measuring light beams in a displaced Sagnac interferometer. Details of creating and selecting parameters of the initial measuring light beams and details of the phase-resolved spectroscopy technique are not described as far as they are known per se from prior art. The invention is not restricted to the particular configuration of the displaced Sagnac interferometer described below, but rather can be varied, e.g. with regard to the positions and/or materials of the optical nonlinear medium, the shiftable reflecting element, the input device and the dispersive medium. The application of the invention is not limited to SFG spectroscopy shown in FIG. 3, but can be used in other spectroscopy techniques, like two-dimensional Terahertz-InfraRed-Visible (2D TIRV) spectroscopy.

Figure 1:
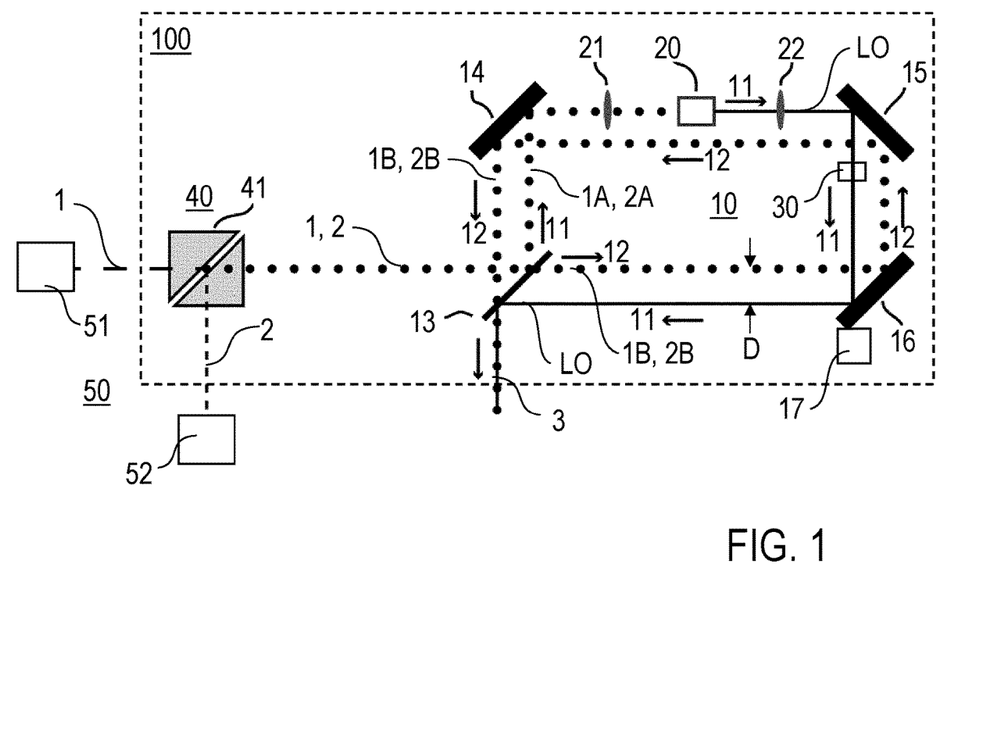
FIG. 1: a local oscillator source apparatus according to a preferred embodiment of the invention.

FIG. 1 illustrates a scheme of a local oscillator source apparatus 100 including a displaced Sagnac interferometer 10 for generating a local oscillator light beam LO. The dashed rectangle illustrates the local oscillator source apparatus 100 as a plug-in module which is combined with a light source device 50 and a detection setup (not shown, see FIG. 3). Dashed and dotted lines represent IR and VIS measuring light beams 1, 1A, 1B, 2, 2A, 2B, respectively. The drawn line represents the local oscillator light beam LO, which is generated inside the interferometer.

The displaced Sagnac interferometer 10 is composed of the first reflecting element 13, comprising e.g. a $CaF_2$ wedge-shaped transparent plate (window plate), the second reflecting element 14, the third reflecting element 15, and the fourth reflecting element 16, comprising three mirrors with a reflecting silver surface. Each of these optical reflecting elements 13 to 16 has a diameter of about 5 cm, and the wedge of the first reflecting element 13 ($CaF_2$ window) is 1°. As an example, the displaced Sagnac interferometer 10 is arranged in a first reference plane corresponding to the drawing plane in FIG. 1 (e.g. the horizontal plane, x-y-plane, see also FIG. 3), with the surface normal directions of the reflecting elements 13 to 16 extending parallel to the first reference plane. The displaced Sagnac interferometer 10 has a rectangular shape, e.g. with a side length of about 30 cm to 50 cm.

The displaced Sagnac interferometer 10 is configured for spanning a first interferometer ring beam path 11, extending from the first reflecting element 13 via the second to fourth reflecting elements 14 to 16 back to the first reflecting element 13 (clockwise direction, see arrows 11). Furthermore, the displaced Sagnac interferometer 10 is configured for spanning a second interferometer ring beam path 12, extending from the first reflecting element 13 via the fourth to second reflecting elements 16 to 14 back to the first reflecting element 13 (counter-clockwise direction, see arrows 12). Generally, the first and second interferometer ring beam paths 11, 12 run in parallel, but with a displacement D, i.e. a distance between the beam paths in the first reference plane. The displacement D is selected in a range of e.g. 10 mm to 30 mm.

The displacement D is obtained by setting at least one of the reflecting elements, e.g. the fourth reflecting element 16, out of the rectangle, that would be spanned by a non-displaced Sagnac interferometer 10. For adjusting the displacement, e.g. the fourth reflecting element 16 can be shiftable with a drive device 17 along the surface normal direction thereof. By moving the fourth reflecting element 16 out of the rectangle spanned by the non-displaced Sagnac interferometer 10, the displacement is increased, and by moving the fourth reflecting element 16 towards the rectangle spanned by the non-displaced Sagnac interferometer 10, the displacement is reduced.

The first interferometer ring beam path 11 includes the optical nonlinear medium 20, like a BBO crystal with a thickness of e.g. 0.1 mm. The optical nonlinear medium 20 can be arranged in each section of the first interferometer ring beam path 11 between two of the reflecting elements, like in the section between the second and third reflecting elements 14, 15, as illustrated.

A focusing lens 21 (e.g. made of $CaF_2$, diameter about 1 cm to 2 cm, f=5 cm) is arranged in the first interferometer ring beam path 11, preferably in the same section like the optical nonlinear medium 20. The focusing lens 21 focuses light travelling on the first interferometer ring beam path 11 at the optical nonlinear medium 20. Subsequently, the light produced by sum-frequency generation in the optical nonlinear medium 20 is collimated by the collimating lens 22 (e.g. made of NBK7, diameter about 1 cm to 2 cm, f=5 cm, AR coating). Again, the collimating lens 22 preferably is arranged in the same section like the optical nonlinear medium 20.

Furthermore, the first interferometer ring beam path 11 includes the dispersive medium 30, comprising e.g. $CaF_2$ plate with thickness of 4 mm. The dispersive medium 30 is arranged in one of the sections of the displaced Sagnac interferometer 10, where the local oscillator light beam LO travels in clockwise direction.

Figure 2:
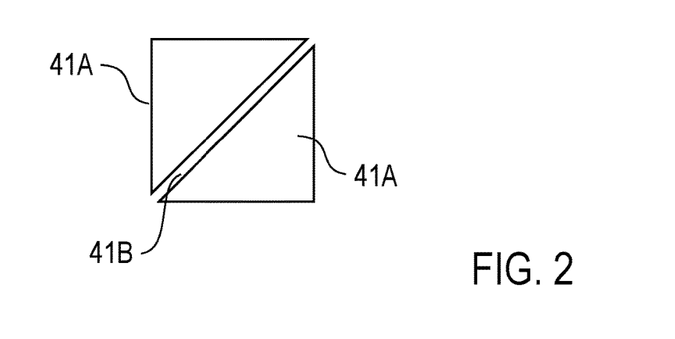
FIG. 2: an example of a beam combiner device included in the local oscillator source apparatus according to FIG. 1.
Figure 3:
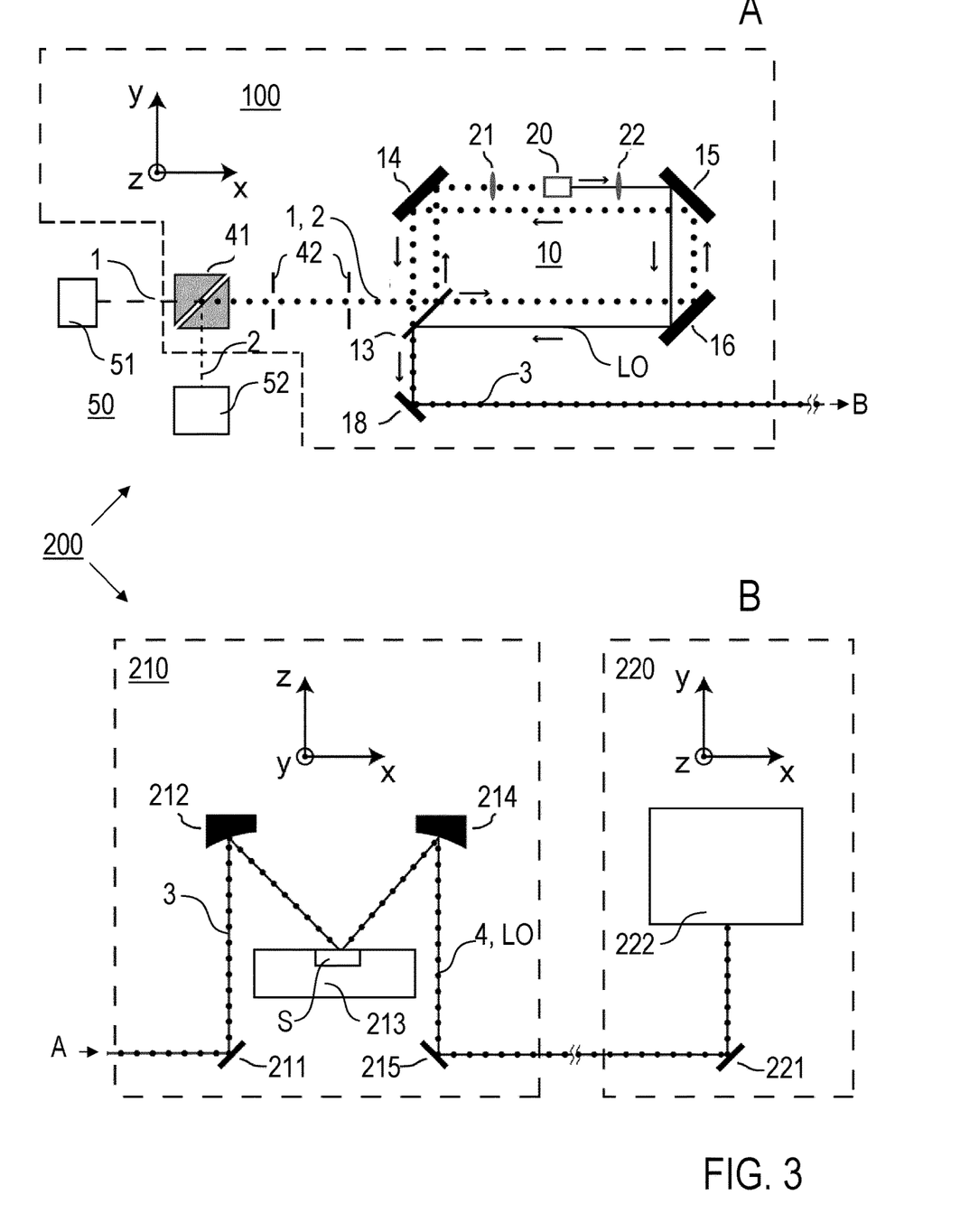
FIG. 3: a phase-resolved spectroscopy measurement apparatus according to a preferred embodiment of the invention.

The displaced Sagnac interferometer 10 is coupled with an input device 40, comprising at least a beam combiner device 41, that comprises two transparent prisms 41A with a spacing, e.g. an air gap 41B, of e.g. 0.001 mm (see also FIG. 2). Further details of the input device 40 are shown in FIG. 3.

A collinear sample light beam 3 is created as a superposition of the local oscillator light beam LO and the first and second measuring light beams 1, 2 as follows. The first and second measuring light beams 1, 2 are created by a schematically shown light source device 50, which is not part of the local oscillator source apparatus 100. The light source device 50 comprises two separate, but synchronized pulsed laser sources 51, 52, like e. g. a femtosecond titanium-sapphire laser and an optical parametric amplifier pumped by a femtosecond titanium-sapphire laser. Accordingly, the first and second measuring light beams 1, 2 are created with center wavelengths in the infrared (IR) and visible (VIS) spectral ranges. To synchronize the first and second measuring light beams, they are overlapped in time. To this end, a time delay of one of those beams is controlled independently, e. g. using a retroreflector installed on a linear translation stage.

The first and second measuring light beams 1, 2 are superimposed with the beam combiner device 41. Accordingly, a sequence of IR/VIS pulse pairs passes through the first reflecting element 13, with a small fraction reflected from both the front and the back surfaces thereof. The reflection from the front surface is blocked (blocker element not shown) and the reflection from the back surface (first portions 1A, 2A of the first and second measuring light beams 1, 2) is aligned to follow the clockwise first interferometer ring beam path 11 in the displaced Sagnac interferometer 10. In the clockwise pathway, the first portions 1A, 2A of the first and second measuring light beams 1, 2 are focused with the focusing lens 21 at the optical nonlinear medium 20. The light produced by sum-frequency generation of the IR and VIS fields in the optical nonlinear medium 20 is collimated by the collimating lens 22 and further relayed as the local oscillator light beam LO following the clockwise pathway toward the first reflecting element 13. At the first reflecting element 13, a fraction of the local oscillator light beam LO is reflected out of the displaced Sagnac interferometer 10. This reflected light is the local oscillator light beam LO for a subsequent spectroscopic measurement (see FIG. 3).

Second portions 1B, 2B of the first and second measuring light beams 1, 2 are transmitted through the first reflecting element 13 and follow the counter clockwise second interferometer ring beam path 12 in the displaced Sagnac interferometer 10. At the exit of the displaced Sagnac interferometer 10, provided by the first reflecting element 13, the local oscillator light beam LO is combined with the second portions 1B, 2B of the first and second measuring light beams 1, 2 (main fractions of the IR/VIS light). All three beams, the local oscillator light beam LO and IR/VIS pulses, are aligned as the sample light beam 3 to a sample S to generate a measuring signal.

FIG. 3 schematically illustrates an embodiment of a phase-resolved spectroscopy measurement apparatus 200, including the light source device 50 with the pulsed laser sources 51, 52 for creating the first and second measuring light beams 1, 2, the input device 40 with the beam combiner device 41 and two aligning irises 42, the local oscillator source apparatus 100 of FIG. 1, a sample holder device 210 for holding the sample S under investigation and for irradiating the sample S with the sample light beam 3, and a phase-sensitive detection setup 220, being arranged for detecting a sample response beam 4 after interacting at least one of the first and second measuring light beams 1, 2 with the sample S.

With the input device 40, two measuring light beams 1, 2, like the IR and VIS pulses, are combined before the displaced Sagnac interferometer 10. The combined beams 1, 2 are aligned into the displaced Sagnac interferometer 10 though the irises 42. The local oscillator light beam LO is created and superimposed with the first and second measuring light beams 1, 2 for providing the sample light beam 3, using the first to fourth reflecting elements 13 to 16 and the optical nonlinear medium 20 with the lenses 21, 22, as described above with reference to FIG. 1.

The sample light beam 3 is relayed via a mirror 18 to the sample holder device 210, which comprises a first plane deflection mirror 211, a first parabolic mirror 212, a sample support 213, a second parabolic mirror 214 and a second plane deflection mirror 215. The beam path in the sample holder device 210 is deflected by the mirror configuration out of the plane of the displaced Sagnac interferometer 10, i. e. in vertical direction (z-direction). Accordingly, supporting the sample S, exciting the sample S and collecting the sample response is facilitated. With the first parabolic mirror 212, the sample light beam 3 is focused into the sample S, that is arranged on the sample support 213. The sample support 213 is e. g. a substrate or a vessel carrying the sample S. After the excitation of the sample S with the sample light beam 3, the sample response beam 4 is created. The sample response beam 4 as well as the collinear local oscillator beam LO are re-collimated with the second parabolic mirror 214 and deflected to the detection setup 220.

The detection setup 220 includes a plane deflection mirror 221 deflecting the beam path back into the horizontal plane to a detector device 222, that is adapted for phase sensitive sampling the electric field of the sample response beam 4, wherein the local oscillator light beam LO is used as time and phase reference.

The features of the invention disclosed in the above description, the drawings and the claims can be of significance individually, in combination or sub-combination for the implementation of the invention in its different embodiments.

The invention claimed is:

1. A method of creating a local oscillator light beam for a phase-resolved spectroscopy measurement, comprising the steps of providing a first measuring light beam and a second measuring light beam being aligned to each other, creating the local oscillator light beam by an optical non-linear interaction of a first portion of the first measuring light beam and a first portion of the second measuring light beam in an optical nonlinear medium, and superimposing the local oscillator light beam, a second portion of the first measuring light beam and a second portion of the second measuring light beam with a predetermined mutual phase relationship, for providing a sample light beam for the phase-resolved spectroscopy measurement, wherein the local oscillator light beam is created and the local oscillator light beam and the second portions of the first and second measuring light beams are superimposed with a displaced Sagnac interferometer, wherein the displaced Sagnac interferometer has a first interferometer ring beam path guiding the first portions of the first and second measuring light beams to the optical nonlinear medium and further guiding the local oscillator light beam created in the optical nonlinear medium, the displaced Sagnac interferometer has a second interferometer ring beam path having a displacement relative to the first interferometer ring beam path and guiding the second portions of the first and second measuring light beams, the displaced Sagnac interferometer has in succession a first reflecting element, comprising a transparent plate and being arranged for coupling light into and out of the displaced Sagnac interferometer, a second reflecting element, a third reflecting element and a fourth reflecting element, the first portions of the first and second measuring light beams are directed from the first reflecting element along the first interferometer ring beam path-4-to the optical nonlinear medium and the local oscillator light beam created in the optical nonlinear medium is directed further along the first interferometer ring beam path to the first reflecting element, the second portions of the first and second measuring light beams are directed from the first reflecting element along the second interferometer ring beam path back to the first reflecting element, and at the first reflecting element, the local oscillator light beam and the second portions of the first and second measuring light beams are combined and coupled out of the displaced Sagnac interferometer as the sample light beam.

2. The method according to claim 1, wherein
a focussing element, the optical nonlinear medium and a collimating element are arranged in the first interferometer ring beam path
the first portions of the first and second measuring light beams are focussed with the focussing element into the optical nonlinear medium and the local oscillator light beam is re-collimated with the collimating element.

3. The method according to claim 1 further comprising a step of
adjusting the displacement of the second interferometer ring beam path relative to the first interferometer ring beam path by shifting one of the second, third and fourth reflecting elements.

4. The method according to claim 1, further comprising a step of
setting the mutual phase relationship of the local oscillator light beam and the second portions of the first and second measuring light beams by guiding at least one of the local oscillator light beam and the second portions of the first and second measuring light beams through at least one dispersive element.

5. The method according to claim 1, wherein
the transparent plate providing the first reflecting element has a wedge shape.

6. The method according to claim 1 further comprising a step of
superimposing the first and second measuring light beams with a beam combiner device, and
aligning the first and second measuring light beams into the displaced Sagnac interferometer though two irises arranged between the beam combiner device and the first reflecting element.

7. A phase-resolved spectroscopy measuring method, comprising the steps of
providing the local oscillator light beam and the sample light beam with the method according to claim 1,
irradiating a sample under investigation with the sample light beam, and
phase-sensitive detection of a sample response beam.

8. The phase-resolved spectroscopy measuring method according to claim 7, wherein the phase-sensitive detection of the sample response beam comprises one of sum frequency generation spectroscopy and two-dimensional Terahertz-InfraRed-Visible spectroscopy.

9. A local oscillator source apparatus, being configured for creating a local oscillator light beam for a phase-resolved spectroscopy measurement, comprising
an input device being arranged for aligning a first measuring light beam and a second measuring light beam,
an optical nonlinear medium being arranged for creating the local oscillator light beam by an optical non-linear interaction of a first portion of the first measuring light beam and a first portion of the second measuring light beam, and
a combining device being arranged for superimposing the local oscillator light beam, a second portion of the first measuring light beam and a second portion of the second measuring light beam with a predetermined mutual phase relationship, for providing a sample light beam for the phase-resolved spectroscopy measurement, wherein
the combining device comprises a displaced Sagnac interferometer being arranged for creating the local oscillator light beam and for superimposing the local oscillator light beam and the second portions of the first and second measuring light beams, wherein
the displaced Sagnac interferometer has a first interferometer ring beam path being arranged for guiding the first portions of the first and second measuring light beams to the optical nonlinear medium and for further guiding the local oscillator light beam created in the optical nonlinear medium,
the displaced Sagnac interferometer has a second interferometer ring beam path having a displacement relative to the first interferometer ring beam path and being arranged for guiding the second portions of the first and second measuring light beams,
the displaced Sagnac interferometer has in succession a first reflecting element, comprising a transparent plate and being arranged for coupling light into and out of the displaced Sagnac interferometer, a second reflecting element, a third reflecting element and a fourth reflecting element,
the reflecting elements are arranged for directing the first portions of the first and second measuring light beams from the first reflecting element along the first interferometer ring beam path to the optical nonlinear medium and for directing the local oscillator light beam created in the optical nonlinear medium further along the first interferometer ring beam path to the first reflecting element,
the reflecting elements are arranged for directing the second portions of the first and second measuring light beams from the first reflecting element along the second interferometer ring beam path back to the first reflecting element, and
the first reflecting element is arranged for combining the local oscillator light beam and the second portions of the first and second measuring light beams into the sample light beam and for coupling the sample light beam out of the displaced Sagnac interferometer.

10. A local oscillator source apparatus according to claim 9, wherein
a focussing element, the optical nonlinear medium and a collimating element are arranged in the first interferometer ring beam path, and the focussing element is arranged for focussing the first portions of the first and second measuring light beams into the optical nonlinear medium and the collimating element is arranged for re-collimating the local oscillator light beam.

11. The local oscillator source apparatus according to claim 9, wherein
one of the second, third and fourth reflecting elements is shiftable for adjusting the displacement of the second interferometer ring beam path relative to the first interferometer ring beam path.

12. The local oscillator source apparatus according to claim 9, wherein
the transparent plate providing the first reflecting element has a wedge shape.

13. The local oscillator source apparatus according to claim 9, further comprising
at least one dispersive element being arranged in at least one of the first interferometer ring beam path and the second interferometer ring beam path for setting the mutual phase relationship of the local oscillator light beam and the second portions of the first and second measuring light beams.

14. The local oscillator source apparatus according to claim 9, wherein the input device comprises
a beam combiner device being arranged for superimposing the first and second measuring light beams, and
two irises being arranged between the beam combiner device and the first reflecting element for aligning the first and second measuring light beams into the displaced Sagnac interferometer.

15. A phase-resolved spectroscopy measurement apparatus comprising
a light source device being arranged for creating a first measuring light beam and a second measuring light beam,
the local oscillator source apparatus according to claim 9, being arranged for providing the sample light beam, and
a sample holder device being arranged for holding a sample under investigation, so that the samplecan be irradiated with the sample light beam, and
a phase-sensitive detection setup, being arranged for detecting a sample response beam.

16. The phase-resolved spectroscopy measurement apparatus according to claim 15, wherein
the phase-sensitive detection setup comprises one of a sum frequency generation spectroscopy setup and a two-dimensional Terahertz-InfraRed-Visible spectroscopy setup.

17. The method according to claim 2, wherein
the focussing element, the optical nonlinear medium and the collimating element are arranged in the first interferometer ring beam path between the second reflecting element and the third reflecting element.

18. The local oscillator source apparatus according to claim 10, wherein
the focussing element, the optical nonlinear medium and the collimating element are arranged in the first interferometer ring beam path between the second reflecting element and the third reflecting element.

* * * * *